United States Patent
Costa et al.

(10) Patent No.: US 6,799,442 B1
(45) Date of Patent: Oct. 5, 2004

(54) SOL-GEL PROCESS FOR THE PRODUCTION OF MANUFACTURES CONTAINING AN INCOMPRESSIBLE INSERT AND MANUFACTURES THEREBY OBTAINED

(75) Inventors: Fulvio Costa, Sommo (IT); Pierpaolo Costa, Sommo (IT); Lorenzo Costa, Sommo (IT)

(73) Assignee: Novara Technology S.r.l., Novara (IT)

( * ) Notice: Subject to any disclaimer, the term of this patent is extended or adjusted under 35 U.S.C. 154(b) by 0 days.

(21) Appl. No.: 09/914,917

(22) PCT Filed: Mar. 8, 2000

(86) PCT No.: PCT/IT00/00076

§ 371 (c)(1), (2), (4) Date: Sep. 6, 2001

(87) PCT Pub. No.: WO00/53536

PCT Pub. Date: Sep. 14, 2000

(30) Foreign Application Priority Data

Mar. 8, 1999 (IT) .......................... NO99A0004

(51) Int. Cl.[7] .............................. C03B 37/016
(52) U.S. Cl. ........................... 65/395; 65/440
(58) Field of Search .................... 65/440, 395

(56) References Cited

U.S. PATENT DOCUMENTS

| 4,680,045 A | | 7/1987 | Osafune et al. |
| 4,775,401 A | | 10/1988 | Fleming et al. |
| 4,786,302 A | | 11/1988 | Osafune et al. |
| 5,185,020 A | | 2/1993 | Satoh et al. |
| 5,240,488 A | * | 8/1993 | Chandross et al. .......... 65/3.11 |
| 5,352,259 A | * | 10/1994 | Oku et al. .................... 65/412 |

FOREIGN PATENT DOCUMENTS

| EP | 0 473 104 | 3/1992 |
| JP | 61-72639 | 4/1986 |
| JP | 62-288130 | 12/1987 |
| JP | 2-172835 | 7/1990 |
| JP | 10-95629 | 4/1998 |

* cited by examiner

*Primary Examiner*—Peter Chin
(74) *Attorney, Agent, or Firm*—Smith, Gambrell & Russell, LLP (57) ABSTRACT

A sol-gel process is described that allows dry gels to be produced, and where necessary, the corresponding dense vitreous bodies, around an incompressible insert. A particular feature of the process is the step of rotating a container holding the sol and incompressible insert throughout the gelling step under such conditions that a wet gel adhering to the insert is produced, which is then dried. The process is useful particularly for the production of preforms for optical fibers, which are also claimed.

6 Claims, 5 Drawing Sheets

SOL-GEL PROCESS FOR THE PRODUCTION OF MANUFACTURES CONTAINING AN INCOMPRESSIBLE INSERT AND MANUFACTURES THEREBY OBTAINED

FIELD OF THE INVENTION

The present invention relates to a sol-gel process for the production of manufactured articles containing an incompressible index and to the manufactured articles so produced.

In particular, the present invention relates to a process for the production of preforms for optical fibers and to the preforms so a produced.

As is known, optical fibers comprise at least one central port and a covering part mode from glass materials with different refractive indices. The difference in refractive index between the two parts of the fiber and the almost glancing angle with which the light radiation impacts on the interface between the two parts of the fiber determine a condition of total reflection, therefore confining the light radiation to the central part. This difference in refractive index is normally achieved by a different chemical composition in the two parts of the fiber, and generally the material with higher index of refraction is in the central part. The materials more commonly employed for the production of optical fibers are glass of mixed silicon dioxide/germanium oxide composition for the central part of the fiber and high-purity silicon dioxide for the covering.

The optical fibers are produced by spinning the so called "preforms" that consist of two coaxial cylinders, a central core and an external covering, corresponding respectively to the central part and to the covering of the final optical fiber. Typical dimensions of the preforms vary between about 0.5 and 1 meter in length, with diameters varying between about 5 and 20 centimeters. The diameter of the core is generally about a third of the overall diameter of the preform. During the spinning process, the preform is heated to a temperature lower than the melting point of the vitreous oxides that compose it, but sufficient to cause them to soften. A material is thus obtained with enough viscosity to maintain the geometric relationship of the parts that compose the preform, but sufficiently low to allow the formation of the fiber by traction.

BACKGROUND OF THE INVENTION

Traditionally, production of preforms for optical fibers starts from a vitreous core already of final dimension and density, obtained for example by the normal technique of melting and subsequent solidification of oxides. The material of the covering is subsequently deposited onto the core, generally employing the technique of chemical deposition from vapor phase, known in the art as "Chemical Vapor Deposition" or CVD, which consists of making two or more either gaseous reagents or reagents in vapor-phase to react at suitable temperature; the reaction product is the material desired. In the case of the optical fibers, silicon tetrachloride ($SiCl_4$) and oxygen are generally employed, giving the reaction:

$$SiCl_4 + O_2 \rightarrow SiO_2 + 2Cl_2 \qquad (I)$$

The silicon dioxide ($SiO_2$) so formed is deposited on the core that is present in the reaction chamber. This covering of $SiO_2$ is initially porous and is densified by subsequent heat treatment.

This technique, used for a long time in the preparation of preforms, has the disadvantage that the $SiO_2$ deposition phase for CVD requires very long times; typically, it requires about 7 hours to give a 2 cm covering thickness after densification.

Alternative techniques to the CVD have been assessed to overcome the problem. In particular, the use of the sol-gel technique, which gives vitreous materials by starting from generally hydroalcoholic solutions, has been much studied.

The name sol-gel generically defines a wide variety of processes that differ in procedural detail or choice of reagents. All sol-gel processes share the following phases:

hydrolysis in a hydroalcoholic solution, called sol, of a $MX_n$ compound, indicated generically as the precursor, containing the M cation, which is at least trivalent and preferably tetravalent, the vitreous oxide of which needs to be formed. The hydrolysis leads to the formation of M-OH groups;

polycondensation of the M-OH groups according to the reaction;

$$M\text{-}OH + M\text{-}OH \rightarrow M\text{-}O\text{-}M + H_2O \qquad (II)$$

with the formation of an oxide polymer, called gel, that occupies all the volume initially occupied by the solution. This phase is generally defined as gelling;

drying of the gel giving a monolithic dry and porous body, with apparent density (weight divided by the geometric volume of the monolithic body) within the range of about $\frac{1}{12}$ and $\frac{1}{5}$ of the theoretical density of the corresponding non-porous oxide. The drying could be achieved by controlled evaporation of the solvent, giving a body known in the art as "xerogel", or by hypercritical extraction of the solvent, giving an "aerogel";

possible densification of the dry gel by heat treatment, giving a vitreous body of theoretical density.

The sol-gel technique shows promise for the production of preforms for optical fibers because it is relatively low-cost, the production times are almost independent of the dimensions of the vitreous body to be produced, and it gives good control of the chemical composition and the dimensions of the final vitreous body.

This technique is already used for the production of the core which is a solid cylinder of a homogeneous glass of mixed silicon dioxide and germanium oxide composition, that is obtained with extreme simplicity by this method.

The covering, consisting of a hollow cylinder, can be produced easily by the sol-gel method, by inserting sol into a cylindrical container to a volume of less than the volume of the same container and setting the container in rapid rotation on its axis for all the time required for gelling, so that the sol is made to adhere to the cylindrical wall of the container by centrifugal force. The gel so obtained presents a cylindrical external surface corresponding to the inside surface of the container and an internal cylindrical surface corresponding to the free equilibrium surface of the sol itself under the action of the centrifugal force. The production of vitreous tubular bodies in this way is described, for example, in U.S. Pat. No. 4,680,045.

U.S. Pat. No. 4,775,401 describes a process for the production of a preform of optical fiber whose covering is produced by sol-gel and then made denser around a core produced apart.

Even though it is possible to produce the core and the covering separately by sol-gel, a sol-gel process that produces a complete preform is desirable. In fact, the formation of a preform starting from two separate bodies creates some problems, like, for example, the possibility that polluting particles or air bubbles will be trapped between the two parts during the phase of densification to give the preform. These defects are retained in the final optics fiber and constitute sources of diffusion of light with consequent loss of efficiency in the transmission. Furthermore, the movement of two separate parts during the phases of drying and densification is more difficult than would be the case if a preform consisted of solidly integrated parts, as happens in the case of the deposition of the covering on the core by CVD.

Until now, however, it has not been possible to produce a similar preform by depositing the covering by sol-gel onto a core already at final density; this is because during the gelling phase a phenomenon to known as syneresis occurs, by which a gel in formation decreases its volume of about 1–3% compared to the volume of the sol, with a isotropic contraction toward its center. If the gel contains inside it an incompressible body, like a dense core of preform, contraction is prevented in the radial direction, but occurs tangentially, giving rise to intense lateral traction forces that leads to the destruction of the gel.

U.S. Pat. No. 4,786,302 describes a process for the production of all the components of the preform that avoids the problem of gelling against a rigid body that opposes the syneresis. According to this process, a hollow cylinder gel of a first composition is prepared by centrifugation, according to the process of U.S. Pat. No. 4,680,045 cited before. A sol with a second composition, different from the first, is poured into the hollow so produced, and allowed to gel. In this way, two concentric wet gels are obtained, that are then dried together and could be densified together to produce the preform. With this process however the two phases of gelling (and respective syneresis) of the different sections of the preform happen in successive moments. In particular, the syneresis of the covering (whose internal diameter reaches the dimensions for which the wet gel is stable) occurs first; subsequently the second sol is inserted in the hollow, that initially occupies the volume defined by the internal diameter of the external gel, but following the syneresis gives rise to a gel of slightly smaller diameter. The result is two physically separated concentric bodies, so possible problems due to the presence of impurities or air bubbles previously discussed are not resolved.

It is therefore impossible, with the present state of the art, to produce a preform for optical fiber in which the covering is produced by sol-gel directly on the core and integral with It.

The object of the present invention is to provide a sol-gel process for the production of manufactured articles containing an incompressible insert, as well as to provide manufactured articles obtained with the process, in particular preforms for optical fibers.

DISCLOSURE OF THE INVENTION

This object is achieved according to the present invention by a sol-gel process for the production of manufactured articles containing an incompressible insert, comprising the steps of:
a) providing an incompressible insert;
b) providing a container which can retain said incompressible insert in rigidly fixed position to define a space between the inside surface of said container and the external surface of said insert, and which can be rotated around the axis of said insert;
c) fixing said insert to the inside of said container in such a way as to rotate said insert as one with said container;
d) filling said space with a sol;
e) setting said container containing said sol and said insert in rotation around the axis of the latter for all the necessary time to the complete gelling of said sol;
f) opening said container and extracting the composite comprising a wet gel adhering to said incompressible insert;
g) drying said wet gel.

The inventors have surprisingly found that, contrary to what was previously known, it is possible to produce a body for sol-gel around an incompressible insert without the syneresis causing the destruction of the gel.

In particular, it has been found that the best results are obtained using an insert preferably of regular polygonal section. Even more preferably, the insert is of circular section, i.e. it is substantially cylindrical.

Furthermore, it has been found that the best results are obtained if, during all the time necessary to the gelling, the sol is rotated around the axis of symmetry of the insert at a predetermined speed depending on the radius of the same insert in the case in which it has a circular section or, in the case in which the insert is a regular polygon in section, depending on the radius of the circumferences inscribed and circumscribed on the section of the polygon. The reasons are not known, but it is thought that In these conditions the syneresis could be counterbalanced by the centrifugal force that acts on the sol.

The container is preferably placed in rotation with such speed for which P, the product of the angular velocity to measured in radians per second (rad/s) and the radius r of the insert measured in centimeters (cm) is between about 20 and about 250 rad×cm/s.

Preferably, and particularly in the case of obtaining the preform for optical fibers, the drying of the gel is carried out by the hypercritical way. In this case, the last operations of the process include the following steps:
opening of the container and extracting the composite constituted by the wet gel and the incompressible insert, inside a bath containing a liquid, in such a way that the surface of the wet gel is not ever exposed to the air;
inserting the bath containing the liquid and the composite wet-gel/incompressible-insert in an autoclave;
extracting the solvent in hypercritical conditions giving a manufactured article constituted by the dry gel containing the incompressible insert.

The original liquid with which the gel is covered in the container, and that is contained in the same pores of the gel, is an aqueous liquid containing alcoholic residues that could vary according to the precursor used in the sol-gel synthesis. For instance, ethanol is the common alcoholic residual left by the hydrolysis of the tetra-ethyl-ortho-silicate (TEOS), one of the most widely used alkoxides in sol-gel synthesis.

In particular, the liquid both in the bath in which the gel is immersed, and inside the pores of the same gel, is substituted by a liquid suitable for hypercritical extraction.

Finally, the processes described above could be completed by a final operation, the densification of the dry gel around the incompressible insert by means of a suitable heat treatment.

BRIEF DESCRIPTION OF THE DRAWINGS

The invention will now be described with reference to the schematic drawings enclosed, in which.

MODES OF CARRYING OUT THE INVENTION

The container employed for the process of the invention could be produced in any material that is chemically compatible with the sol and that has sufficient mechanical strength to withstand without deformation or vibration the conditions that are met during rapid rotation.

The sol has a high density, varying generally between about 0.8 and 1.6 g/cm$^3$, for which the pressure exerted by the sol on the side parts of the container during rotation is high. Accordingly, metals are the materials preferred for the production of the container. Furthermore, the sol is generally an hydroalcoholic solution containing small quantities of acids, generally HCl, to promote the hydrolysis of the precursor compound $MX_n$. Metallic materials, for instance steel, covered entirely by a thin layer of material plastic, preferably Teflon® (registered mark in the name of DUPONT) are therefore preferred for the container to prevent chemical etching on the walls of the container by the sol. The use of an internal covering made of plastic material also promotes the separation of the wet gel from the walls of the container.

Figure 1:
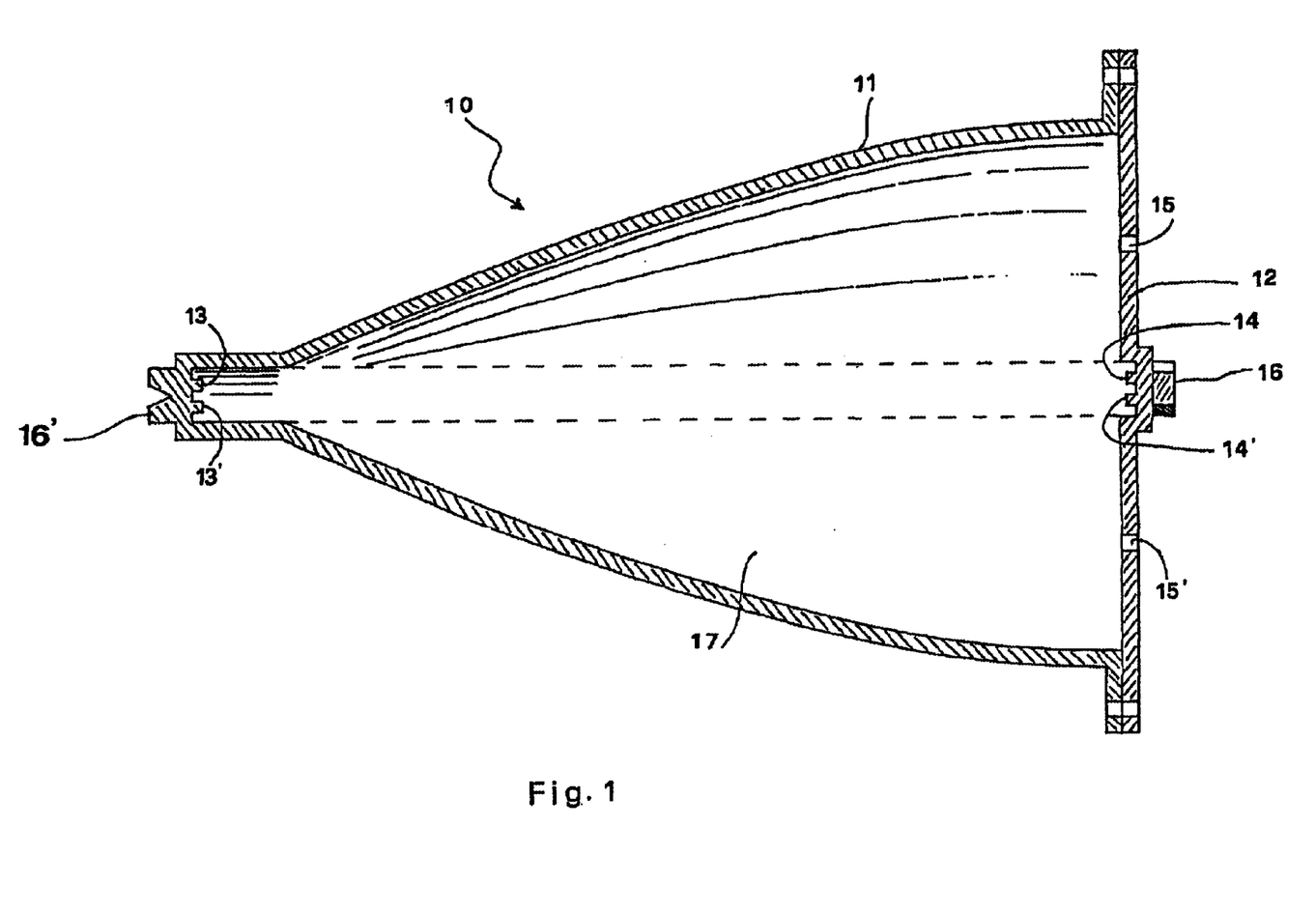
FIG. 1 is a section view of a container that could be used in the process according to the invention.
Figure 2:
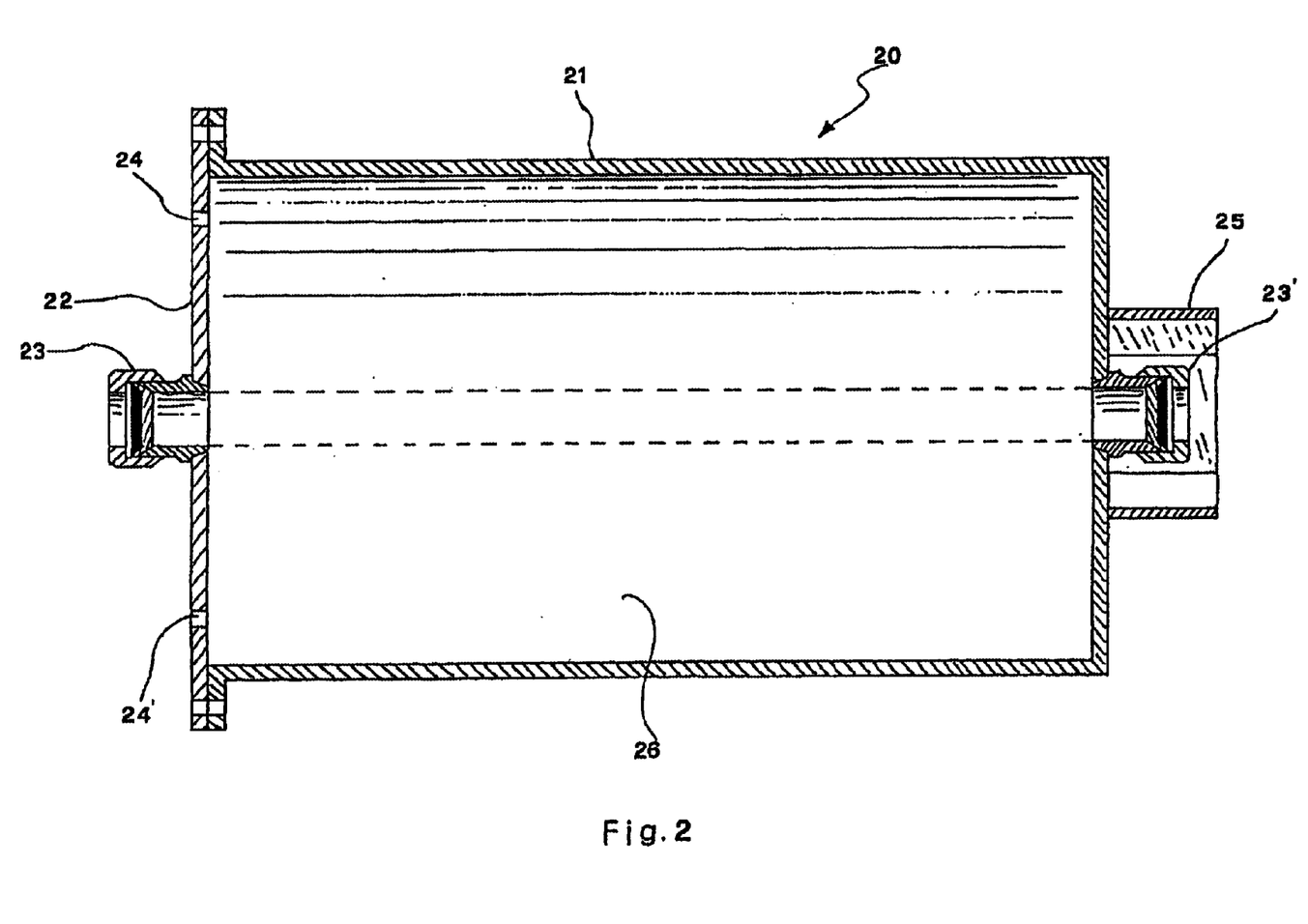
FIG. 2 is a section view of another container, suitable for the production of preforms for optical fibers according to the process of the invention.

FIGS. 1 and 2 show two possible embodiments of the container employed in the process according to the invention.

FIG. 1 shows a section view of a first possible generic form of the container.

The container 10 comprises a principal container 11 and a cover 12, that could seal the container 11 by a system of flanges (as shown in the figure), or by screwing the cover 12 to the container 11 (suitable to reciprocal threads having been provided on these two parts), or by other known sealing methods. Gaskets (not shown in figure), for example of the O-RING type, located in the zone of contact between the container 11 and the cover 12, can be used to seal the container more securely according to known methodology.

The container 11 and the cover 12 present means for fixing the incompressible insert which create the condition that the container and the insert rotate as one during the gelling phase. These means of fixing could be very varied. FIG. 1 shows two teeth 13, 13' at the extremity of the container 11, and two teeth 14, 14' at the center of the cover 12; these teeth engage in corresponding recesses on the two bases of the incompressible insert. It is evident, however, that the teeth and recesses could be more numerous, or that they could be positioned differently (provided that their positions on container and insert correspond). Furthermore, the rotation of the container and of the insert together as one can be assured by side locking, as will be described in detail with reference to FIG. 2.

The cover 12 presents two identical openings 15, 15', one of which is used to fill the closed container in which the insert is already present with the sol, while the other vents air during filling. When filled, the two openings could be closed with any suitable element (e.g. threaded metal plugs)—not shown in figure—whose hermetic seal on the cover could be ensured with gaskets, (e.g. of the O-RING type).

Finally, two elements 16, 16,' are so positioned to be aligned with the axial symmetry of the axis of the incompressible insert, so they can be used to fit the container to the apparatus employed for its rotation, (e.g. a lathe). In FIG. 1 these elements are shown respectively as a raised hexagonal boss 16, (in plan, not in section) which could be gripped by the chuck of a lathe, and as a hollow element 16' (seen in section) to receive the tailstock of the same lathe. FIG. 1 also shows, with broken line, the outline of the incompressible insert, which defines a space 17 between the external surface of the insert and the inside surface of the container.

FIG. 2 shows a section view of a container suitable for the production of preforms for optical fibers. In this case, the container 20 is cylindrical and comprises a principal container 21 and a cover 22. Also in this case, the container 21 and cover 22 are shown in the figure connected by means of flanges, but they could be connected hermetically by any known means. The cylindrical base of the container 21 and the cover 22 are perforated in correspondence to the axis of symmetry of the container.

In these holes are inserted the Swagelok® links 23 e 23' of suitable diameter, which in this case constitute the system of fixing the incompressible insert in the container. Also in this case, FIG. 2 shows the outline of the insert with a broken line, which defines a space 26 with the inside walls of the container. The Swagelok® links produced and sold by Swagelok Co., of Solon, Ohio, USA, is widely known and used, in particular to make connections and junctions in gas lines, and are available with internal diameters from about 1 mm to about 45 mm. For this application, In particular, the use of links of the "Bored-Through" type, normally used for thermocouples, is preferred. The way of fixing the insert with these links is described below. As in the case of the container 10, the cover 22 has openings 24, 24' to fill the space 26 with the sol and to vent the air during this operation.

The cover 22 and the cylindrical base of the container 21 could present elements to connect to the apparatus employed for rotating the container (e.g. hexagonal plan elements— only one of which is shown in FIG. 2 as element 25) that could be fixed in various ways (for example, by screws) to the container 21 and to the cover 22 and that could also have a protective function for the links 23 and 23.'

Figure 3:
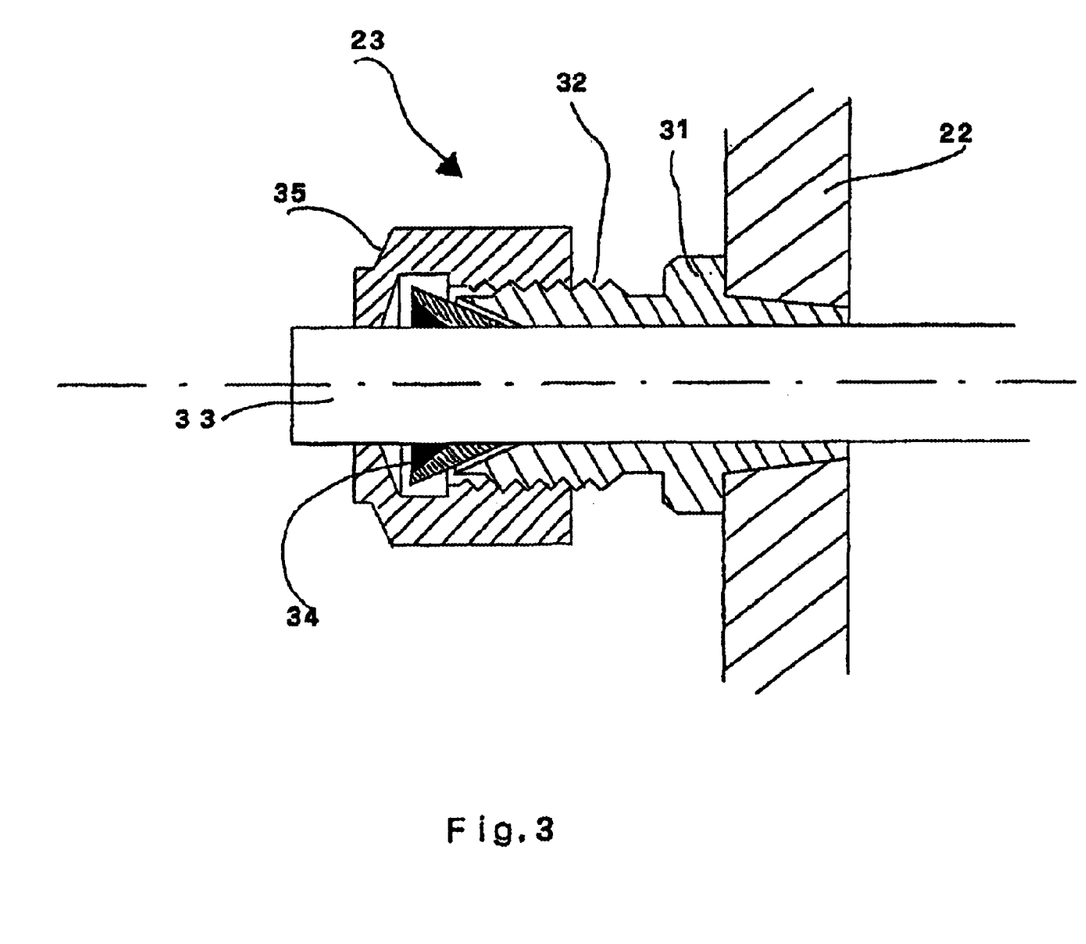
FIG. 3 shows a detail of a possible way of fixing the incompressible insert in the container of FIG. 2.

FIG. 3 shows how to fix and center the insert through the Swagelok® links taking the link present on the cover 22 for instance. The link 23 comprises a principal part 31, screwed into the cover 22 (for simplicity, the threading between link and cover is not shown in figure) or where necessary welded. The zone 32 of the part 31 is threaded.

The incompressible insert 33 is inserted into the through hole of the 20 part 31, and the ferrule 34 (that could be made from metal, such as steel or copper, or polymeric material, such as Teflon® or Nylon) is made to slide on said insert until it makes contact with the part 31. Nylon or copper is preferred for the ferrule.

Finally the part 35 with female threading is inserted, and screwed onto the part 31 via threads on the zone 32. Screwing the part 35 onto part 31 deforms and compresses the ferrule onto the insert 33, fixing and centering the latter with respect to the axis of the container.

The container employed in the process according to the invention could differ from those described here in shape or construction details. It is important, however, that all the constituent elements of such containers, (teeth, recess, valves or other), are arranged symmetrically around the axis of rotation, to give equal distribution of the weight and eliminate one possible source of vibration of the container during high-speed rotation.

The incompressible insert could be made from any material, according to the purpose of the final manufactured article. Preferably, the insert must not be of plastic materials, which give little adhesion to the gel. If an aerogel is needed, an operation of hypercritical drying in autoclave is required and the material of the insert must resist the hypercritical conditions of the liquid in which the composite wet gel/insert is immersed. These conditions vary from temperatures of about 40° C. where the liquid is $CO_2$ liquid, to about 300° C. in the case of the lower alcohols.

Finally, where a final dry gel densification treatment is scheduled, it generally requires temperatures varying between 800° C. and 1400° C. and the material from which the insert is made must resist these temperatures and, therefore, must be a metal, a glass with high melting point or a ceramic, for instance.

In the case of the production of optical fibers, the incompressible insert is a dense cylinder of a mixed silica-based glass with additives of oxides of other elements. Typical chemical compositions of the insert glass are, for example: $SiO_2$—$GeO_2$, $SiO_2$—$P_2O_5$—$GeO_2$, $SiO_2$—$Al_2O_3$, $SiO_2$—$TiO_2$, $SiO_2$—$GeO_2$—$Ln_2O_3$, $SiO_2$—$P_2O_2$—$GeO_2$—$Ln_2O_3$, $SiO_2$—$Al_2O_3$—$Ln_2O_3$ e $SiO_2$—$TiO_2$—$Ln_2O_3$, where Ln indicates any element of the Lanthanide series.

The incompressible insert is inserted into the container 11 of FIG. 1 (or the container 21 of FIG. 2) to which the cover 12 (or 22) is then fixed and sealed and the insert is fixed to the container for the rotation of the two as one by matching teeth and recesses 13, 13', 14 and 14', or through Swagelok® links as previously described with reference to the container shown in FIG. 2.

The space 17 (or 26), defined by the inside walls of the container 11 (or 21) and the insert, is then filled with the sol. For the preparation of the sol, see the ample sector literature, among which are, for example, the patents already cited. The sol could have any chemical composition, but in the case of the production of preforms for optical fibers this will be such as to lead to the formation of $SiO_2$ of the highest possible purity. The container is filled with the sol through one of the holes 15 or 15' on the cover 12 of FIG. 1, or through one of the holes 24 or 24' on the cover 22 of FIG. 2. The presence of an air vent hole (for example, the hole 15' if it is filled through the hole 15) guarantees complete filling of the available volume.

After the openings 15 and 15' (or 24 and 24') on the cover have been sealed hermetically, the container is mounted on an apparatus (e.g. a lathe) that allows it to be rotated around the axis of the insert. Preferably the axis of rotation is horizontal.

The container is run up to the predetermined speed of rotation preferably in the space of between about 30 seconds and 1 minute. The speed of angular rotation, $\omega$, is related to the radius r of the insert by the equation:

$$P = \omega \times r$$

and is such that, measuring $\omega$ in radians per second (rod/s) and r in centimeters (cm) the values of P are between about 20 and 250 rad×cm/s. For values of P outside the interval defined above, the gel breaks. Although the reasons are not clear, it is thought that this happens because at values lower than about 20 rad×cm/s, the centrifugal force that acts on the gel in formation is not sufficient to counterbalance the syneresis, while at values above about 250 rad×cm/s vibrations are probably produced in the system that jeopardize the mechanical stability of the gel information. The total time for which the container containing the gel must be maintained in rotation is equal at least to that for which a sol of the same composition reaches complete gelling and completes its syneresis. This time depends on the chemical composition of the sol, particularly on its pH, and can be determined with a parallel test on a sample of the same sol allowed to gel in static conditions, since rotation does not vary the gelling time.

At the end of the rotation, the container is opened and the composite comprising a wet gel adhering to the incompressible insert is extracted. The gel part of this composite could be dried by a different process, according to whether a xerogel or an aerogel is required, as previously described. To get a xerogel it is generally necessary to control the solvent evaporation parameters, for example limiting the speed of evaporation by inserting the gel into a microporous container, as described in U.S. Pat. 4,660,046 already cited.

According to the present invention, the gel is preferably dried in hypercritical way, giving an aerogel. In this case the wet gel must never be exposed to the atmosphere, to avoid even the minimum evaporation of solvent from the pores, which could be the cause of surface fracturing of the gel. The opening of the container and the extraction of the composite wet-gel/incompressible-insert must therefore be carried out in a bath containing a liquid, equal or different from the one present in the pores of the gel. The hypercritical extraction of the solvent could be effected by the same solvent of reaction, generally an alcohol-rich hydroalcoholic mixture once it has been freed of the fraction of process-water. In this case, temperatures of about 300° C. and pressures of about 70 bar are required: the critical temperature and pressure of ethanol are 243° C. and 63 atmospheres respectively. Since the autoclaves that can resist these conditions are of complex construction, it might be preferable to first exchange the solvent present in the pores of the gel, replacing the aqueous alcohol mixture of reaction with chlorinated solvents which have critical values between about 200–280° C. and 30–60 bar, or with $CO_2$ liquid, which has critical values of about 40° C. and 70–80 bar.

The bath containing the liquid in which the opening of the container and the extraction of the composite is carried out could be used for exchanging the solvent and in any case, as container containing the composite covered with liquid which is introduced into the autoclave. The procedure for the solvent-exchange and hypercritical extraction of this is widely known to those skilled in the art.

Figure 4:
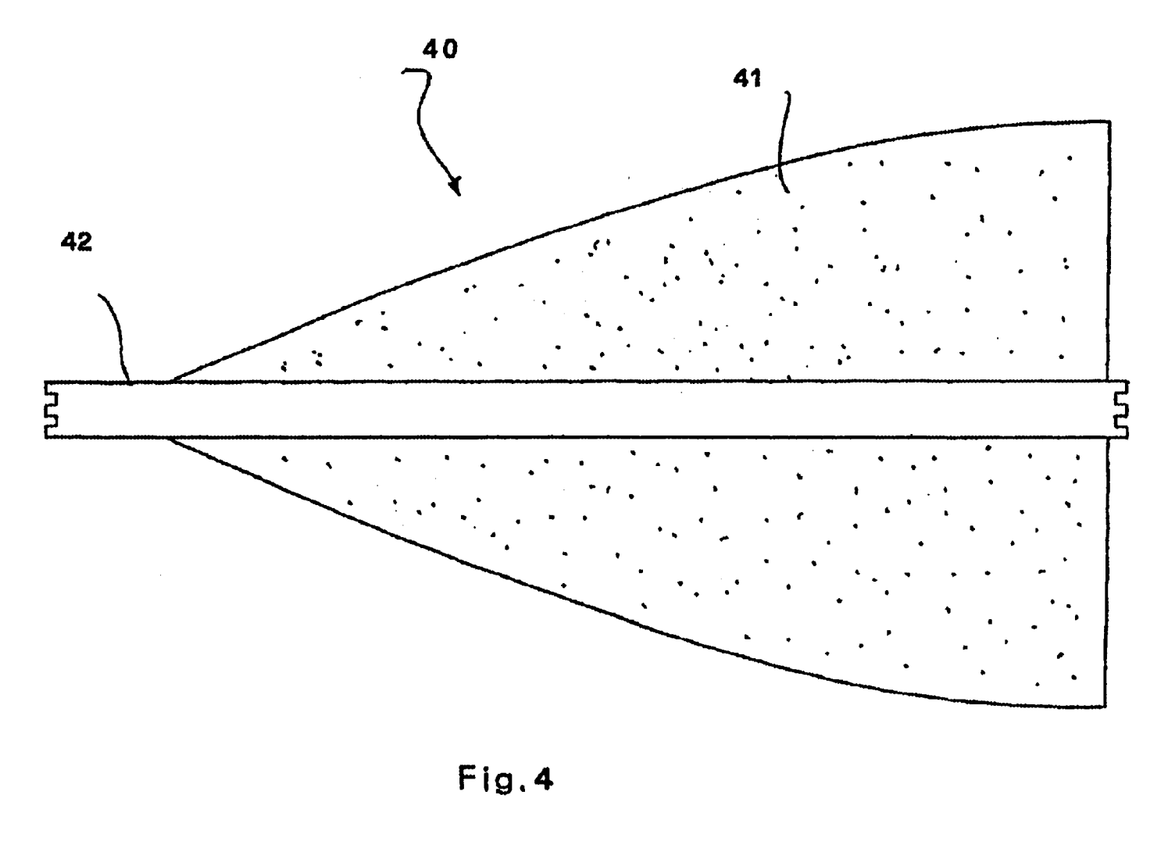
FIG. 4 is a section view of the manufactured article obtained through the process of the invention with the use of the container of FIG. 1.

FIG. 4 shows in section a manufactured article 40 obtained by the process of the invention through the use of the container of FIG. 1. This manufactured article comprises a part 41, consisting of the dried but still porous gel, adhering to the incompressible insert 42. The recesses that receive the teeth 13, 13' and 14, 14' of the container are visible in the extremities of the insert.

In the case of the production of preforms for optical fibers, the manufactured article comprising the dry gel (whether xerogel or aerogel) contains a cylindrical incompressible insert corresponding exactly to the product obtainable with the CVD technique before the densification of the $SiO_2$ layer, that was until now impossible to get with the sol-gel technique.

The manufactured article so produced can finally be subjected to a treatment of densification of the dry gel part.

The densification requires temperatures of about 800–900° C. in the case of xerogel, and about 1000–1400° C. in the case of aerogel. During the heat treatment, the gel could be subjected to purification treatments, for example by streaming an atmosphere containing oxygenates into the oven when the temperature is about 300–500° C. to remove organic mixtures, and chlorinated gases such as $Cl_2$, HCl o $CCl_4$ at temperatures of about 700–800° C. to remove metallic impurities, as is known to those skilled in the art. The final steps of the densification are generally carried out in an inert atmosphere, for example pure helium or an atmosphere containing low percentages of oxygen.

Figure 5:
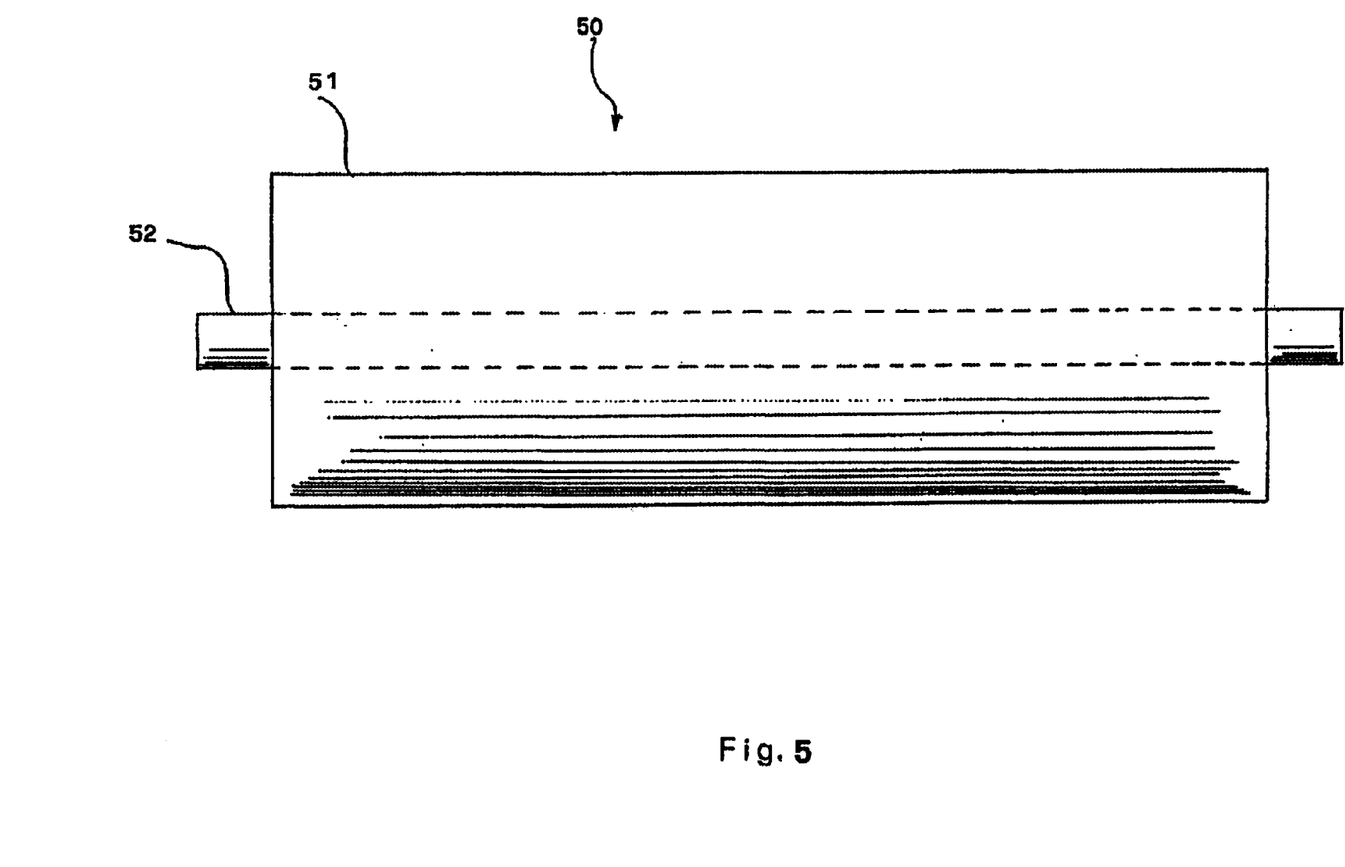
FIG. 5 shows a preform for optical fiber obtained with the use of the container of FIG. 2.

In the case of the preforms for optical fibers, the product of the treatment of densification is the preform ready for the spinning of the fiber. FIG. 5 shows such a preform 50, in which the covering 51 is the result of the process of the invention after densification and the part 52 is the core of the preform, that in this case constituted the incompressible insert at the beginning of the process.

The invention will be further illustrated by the following examples. These examples are not limiting; they illustrate some embodiments to teach those skilled in the art how to put the invention into practice and to show the considered best way for the realization or the invention.

EXAMPLE 1

A cylindrical die in stainless steel of the type shown in FIG. 2 is predisposed, whose inside dimensions are 30.7 cm in length and 9.3 cm. in diameter. Into the die is inserted an incompressible insert, consisting of a quartz cylinder 37.0 cm long and 0.8 cm in diameter that is fixed rigidly in position coaxially with respect to the die by means of Swagelok® links as described above.

A silica sol is prepared separately by mixing 500 g of tetra-ethyl-ortho-silane (TEOS) with 700 cc of an aqueous HCl solution at a concentration of 0.01 N. The sol is homogenized first by mechanical agitation, then by ultrasound for 6 minutes. In this phase the TEOS is hydrolyzed by the water, giving place to four molecules of ethyl alcohol per molecule of TEOS. 250 grams of "Aerosil OX-50" colloidal silica from Degussa GmbH are added to the sol. The mixing of the colloidal silica into the "sol" is accelerated by vigorous mechanical agitation, followed by treatment with ultrasound for 30 minutes, and finally by centrifugation at 2000 rpm for another 30 minutes. The sol obtained is poured into the predisposed die through opening 24 shown in FIG. 2. The die is rotated around its axis at an angular velocity, ω, of 125.6 rad/s, which corresponds, for the insert employed, to a P value of 50.24 rad x cm/s. The rotation is maintained for 12 hours, to allow for complete gelling of the sol. Then the die is opened, the wet gel is extracted comprising the cylinder in quartz, and the water present in the pores of the gel is exchanged with ethanol by three subsequent washings by immersion. The hypercritical extraction of ethanol is carried out in an autoclave at 70 bar and 280° C. The aerogel extracted from the autoclave, containing the incompressible insert in quartz, did not present defects such as cracks or fragmentation of the surface. The aerogel was subjected to a densification heat treatment; the chamber of the oven was constituted by a quartz pipe connected up to the ends of gas lines. The treatment comprised heating from ambient temperature to 500°C. over 30 minutes, followed by maintenance at 500°C. in airflow for 6 hours; heating from 500 to 800°C. over 30 minutes and maintaining at 800°C. for 54 hours. During the first 42 hours, anhydrous HCl was streamed through the oven chamber and pure helium in the subsequent 12 hours; finally, always in a stream of helium, the temperature was raised from 800 to 1375°C. over one hour, and maintained at this value for 30 minutes, after which the oven was left to cool naturally. The final product is a manufactured article constituted by a covering in whole silica glass that does not present surface defects, densified around the incompressible insert in quartz introduced into the die at the beginning of the process.

EXAMPLE 2

Comparative

The process of the Example 1 was repeated, but without centrifugation of the sol in the gelling phase (i.e. with values of ω and P equal to 0). Opening the die after the 12 hours of gelling, the part of the hydrogel present around the incompressible insert in quartz presented deep fractures and was partially separated from the insert.

What is claimed is:

1. Sol-gel process for the production of vitreous body articles containing an incompressible insert comprising:
   a) providing an incompressible insert;
   b) providing a container which can retain said incompressible insert in rigidly fixed position to define a space between an inside surface of said container and an external surface of said insert, and which can be rotated around an axis of said insert;
   c) fixing said insert to the inside of said container is such a way as to rotate said insert as one with said container;
   d) filling said space with a sol and closing said container;
   e) rotating said container containing said sol and said insert around the axis of the insert for a sufficient period of time necessary to complete gelling of said sol;
   f) opening said container and extracting the composite comprising a wet gel adhering to said incompressible insert;
   g) drying said wet gel, whereby said container in step e) is placed in rotation at such speed that the product P of the angular velocity ω measured in radians per second (rad/s) and the radius r of the insert measured in centimeters (cm) is between about 20 and about 250 rad×cm/s and adding a step of glass densification of the dry gel adhering to said incompressible insert by means of heat treatment at a temperature within the rankle of about 800 to about 1400° C.

2. A process according to claim 1, wherein said incompressible insert is cylindrical.

3. A process according to claim 1, wherein said container is cylindrical.

4. A process according to claim 1, wherein the opening of said container and the extraction of aid composite in step f) is carried out inside a bath containing a liquid.

5. A process according to claim 4, wherein the liquid in which step f) is carried out is selected from the group consisting of alcohols, chlorinated solvents, and $CO_2$ liquid.

6. A process according to claim 1, wherein step g) of drying of the wet gel is carried out in hypercritical way preceded by a gel-washing phase.

* * * * *